(No Model.)  2 Sheets—Sheet 1.
P. M. STEVENS.
HOSE COUPLING.

No. 405,748.  Patented June 25, 1889.

WITNESSES
Carroll J. Webster
S. B. Roane

INVENTOR
Philo M. Stevens
By Wm Webster
Atty (No Model.) 2 Sheets—Sheet 2.
P. M. STEVENS.
HOSE COUPLING.

No. 405,748. Patented June 25, 1889.

WITNESSES
Carroll J. Webster.
A. B. Roane

INVENTOR
Philo M. Stevens
By Wm Webster
Atty

UNITED STATES PATENT OFFICE.

PHILO M. STEVENS, OF TOLEDO, OHIO.

HOSE-COUPLING.

SPECIFICATION forming part of Letters Patent No. 405,748, dated June 25, 1889.

Application filed March 16, 1889. Serial No. 303,563. (No model.)

*To all whom it may concern:*

Be it known that I, PHILO M. STEVENS, a citizen of the United States, residing at Toledo, in the county of Lucas and State of Ohio, have invented certain new and useful Improvements in Hose-Couplings; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to hose-couplings of that character used in coupling hose for fire-department service, water-service, and couplings for steam-pipe connections for car-heating and like purposes.

The object of the invention is to provide a coupling that shall be positive in connection, adjustable as to wear, and in which each section shall be interchangeable or adapted to be coupled with a companion section regardless of a particular direction of the coupling end presented.

A further object is to provide, in the construction of the coupling, movable cylinders within the outer casing, which shall be caused by friction and fluid-pressure to closely abut at each end to prevent the escape of fluid under pressure when incased by an outer encircling cylinder.

The invention consists in the parts and combination of parts hereinafter described, and pointed out in the claims.

Figure 1:
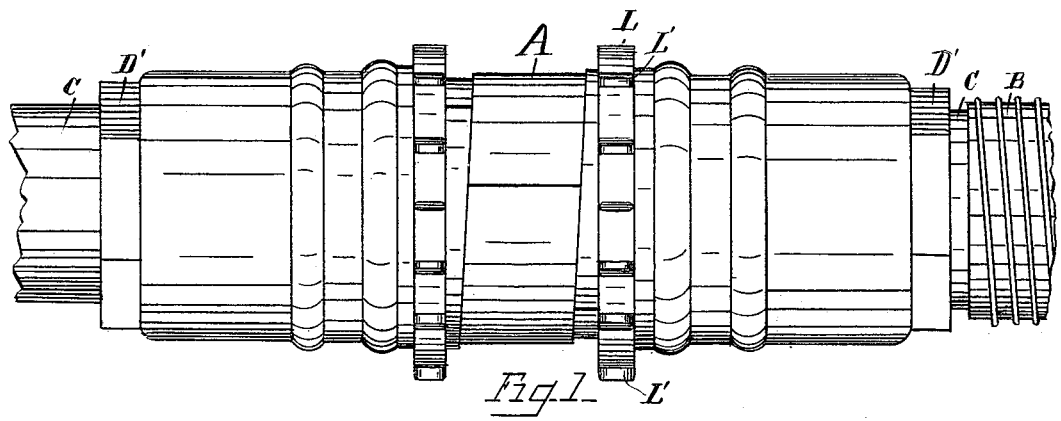
Figure 2:
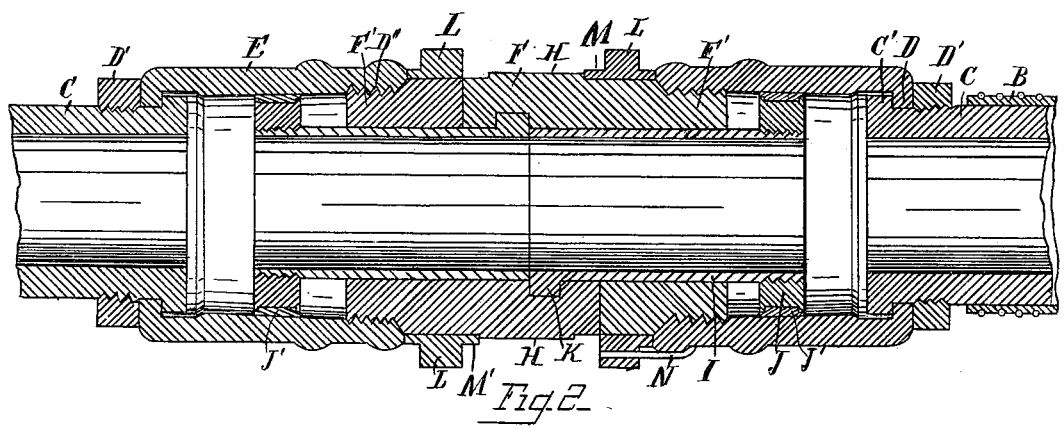
Figure 3:
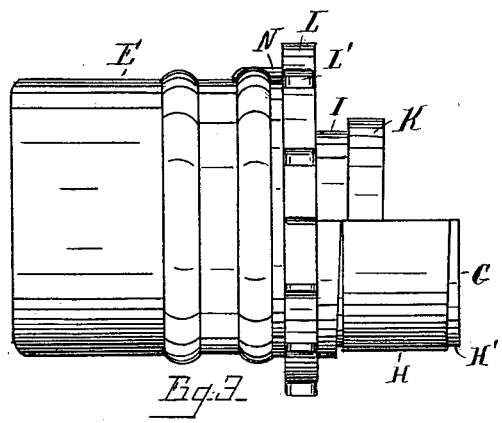
Figure 4:
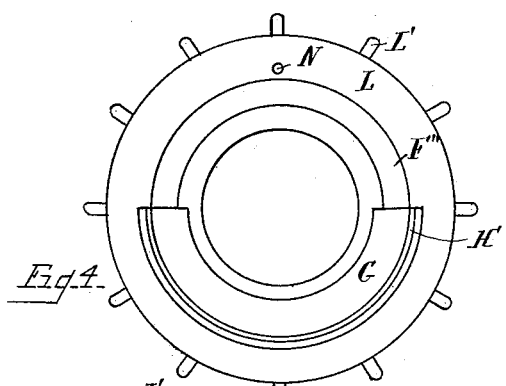
Figure 5:
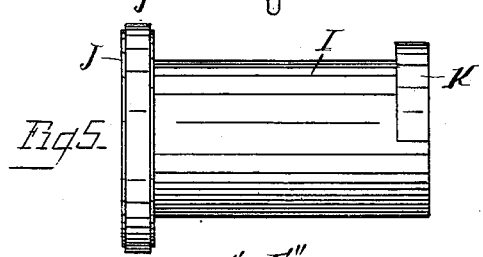
Figure 6:
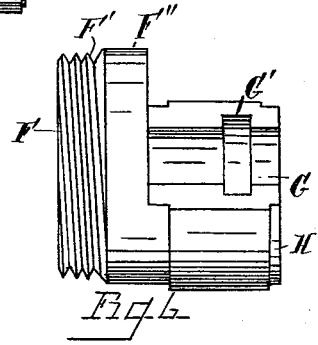

In the drawings, Figure 1 is a plan view of a complete coupling, showing a portion of hose secured at one end thereof. Fig. 2 is a longitudinal vertical section of the same. Fig. 3 is a side elevation of one section of the coupling. Fig. 4 is an end view of the same. Fig. 5 is a plan view of one of the internal cylinders. Fig. 6 is a detail view of one of the cylinders.

A designates a complete coupling having a hose B secured at one end thereof by being telescoped upon an end pipe C, secured within one end of the coupling by means of an annular shoulder C', fitting against an annulus D within the coupling, the gland being rendered steam-tight by means of a nut D', screwed upon pipe C and abutting against the outer surface of the end of the coupling.

As the coupling is composed of two interlocking sections of precisely the same structure, the letters of reference designating the several parts of one section will be employed in referring to the parts of the opposite section.

E designates an outer shell of one section of coupling formed with the inwardly-projecting annulus D at one end and being internally threaded at the opposite end, as shown at D''.

F designates a cylinder formed with a screw-threaded end F', adapted to be screwed into the screw-threaded end of shell E, as shown in Fig. 2, the cylinder being of somewhat larger diameter back of the screw-threads, as shown at F'', from which point one-half of the cylinder is cut away, the remaining half G being extended some distance beyond the cylindrical portion and the internal surface thereof channeled out, as at G', for a purpose hereinafter stated.

The outer surface of the half-cylinder G is formed with a raised surface H, having a cam-face H' upon the front portion thereof.

I designates a cylinder telescoped within the cylinder F and having an adjustable annular end J, provided with a packing J', adapted to bear with a steam-tight pressure against the inner sides of the shell E, the opposite end of the cylinder I having a semicircular projection K, adapted to fit within channel G' of cylinder F, the semicircular projection K being of a half-circle to allow the same to pass the one-half extension G of cylinder F when turned with the extension upon the upper side when placing the same in position, it being understood that the end J of cylinder I is removed when passing the same through cylinder F, and that when the same is inserted the edges of the semicircular projections K rest upon the semicircular extension of the cylinder G and the end J, screwed upon the threaded end.

L designates a ring encircling cylinder F, said ring bearing upon one side of shell E, the opposite side of the ring being formed with a semicircular cam projection M, which bears against the cam-faces H' of the end G of cylinder F.

Each ring L is provided with spring-catches N, which engage frictionally with an annular raised surface upon shell E, the rings L being also formed with transverse ridges L' to allow the use of a wrench or spanner in turning the same.

In assembling the parts to form a coupling, end pipes C are passed through shell E and secured by nuts D', cylinders F, and the end J screwed into place. Rings L are now placed upon cylinder F, with the spring-catches N directed toward the end of the coupling, and the cylinder F is now screwed into the threaded end of shell E, which brings the packing J' of the end J of cylinder I into close engagement with the interior of shell E. Rings L are now turned so that the semicircular cam-faces M coincide with the semicircular projection of cylinder F. The cylinders I are adjusted to cause the projections K to register and seat within channels G', thereby causing the ends of the cylinders to abut closely, by which a steam-tight fluid-conduit is established, when rings L are turned to cause the cam-faces to engage with the cam-faces H' of each opposite coupling-section, thereby drawing the sections closely together.

In order to uncouple the sections, rings L are turned a half-circle, thereby relieving the cam-faces of pressure and causing the same to register with the semicircular projection G, and by moving the sections in opposite directions vertically to remove projections K from recesses G' the sections are easily separated.

It will be seen that the fluid-pressure within the coupling bearing against the ends J and packing J' of cylinders I causes the inner ends thereof to be closely pressed together to assist in making the same steam-tight.

The device is simple in construction, easily coupled and uncoupled, and effectually obviates any danger of uncoupling without manual manipulation, as any strain or pressure longitudinally but more closely assembles the parts.

What I claim is—

1. In a coupling, the combination, with an outer shell, of a cylinder screwed within the same and formed with a forward semi-cylindrical portion having an internal transverse groove and external cam-surface, a second cylinder sliding within said cylinder and having a projection at its forward end, and a cam-faced ring turning on the rigid cylinder, substantially as shown and described.

2. In a coupling, oppositely-arranged cylindrical shells, cylinders arranged within the same having projecting semicircular channeled end portions, with telescoping cylinders moving within the same having projections to fit within the shell, and the cam-faced rings turning upon the rigid cylinders and adapted to lock the coupling, substantially as shown and described, as and for the purpose set forth.

3. In a coupling, the combination, with an outer shell, of a cylinder rigidly screwed within the same and having its forward end cut away to form a semi-cylindrical portion, said portion having a transverse groove upon its interior surface near its forward end and having its exterior surface formed with a cam-surface, a second cylinder sliding within the rigid one and the outer shell, its inner or rear end having a packing-ring adapted to bear upon the interior of the shell and form a tight joint, the forward end of said movable cylinder having a semicircular projection adapted to engage with the groove in the rigid cylinder, and a cam-ring turning on the said cylinder to lock two abutting couplings in place, substantially as shown and described.

4. In a coupling having an outer shell E, a cylinder F, rigidly secured thereto, and a sliding cylinder I within the same, an adjustable ring J, secured to the inner end of the cylinder I and grooved to receive the packing-ring J', whereby a tight joint is made with the sides of the outer shell E, substantially as and for the purpose set forth.

In testimony that I claim the foregoing as my own I hereby affix my signature in presence of two witnesses.

PHILO M. STEVENS.

Witnesses:
WILLIAM WEBSTER,
CARROLL J. WEBSTER.